(12) United States Patent
Zhou et al.

(10) Patent No.: US 11,444,743 B2
(45) Date of Patent: Sep. 13, 2022

(54) DEACTIVATING RESOURCES FOR REPETITIONS OF PERIODIC COMMUNICATIONS

(71) Applicant: QUALCOMM Incorporated, San Diego, CA (US)

(72) Inventors: Yan Zhou, San Diego, CA (US); Konstantinos Dimou, San Francisco, CA (US); Tao Luo, San Diego, CA (US); Kazuki Takeda, Minato-ku (JP); Seyed Ali Akbar Fakoorian, San Diego, CA (US); Mostafa Khoshnevisan, San Diego, CA (US); Xiaoxia Zhang, San Diego, CA (US); Sony Akkarakaran, Poway, CA (US); Hamed Pezeshki, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 36 days.

(21) Appl. No.: 16/879,503

(22) Filed: May 20, 2020

(65) Prior Publication Data

US 2021/0006385 A1 Jan. 7, 2021

Related U.S. Application Data

(60) Provisional application No. 62/870,418, filed on Jul. 3, 2019.

(51) Int. Cl.
*H04W 4/00* (2018.01)
*H04L 5/00* (2006.01)
(Continued)

(52) U.S. Cl.
CPC .......... *H04L 5/0098* (2013.01); *H04L 5/0055* (2013.01); *H04W 72/042* (2013.01); *H04W 76/27* (2018.02); *H04W 80/02* (2013.01)

(58) Field of Classification Search
CPC ... H04L 5/0098; H04L 5/0055; H04L 1/1657; H04L 1/0009; H04L 5/001; H04L 5/0082;
(Continued)

(56) References Cited

U.S. PATENT DOCUMENTS

2004/0018848 A1* 1/2004 Ogino ................... H04W 76/40
455/519
2017/0156138 A1* 6/2017 Yamamoto ............ H04L 5/0007
(Continued)

OTHER PUBLICATIONS

Sequans, "PDCCH enhancements for URLLC", R1-1900680, Jan. 21-25, 2019. (From Applicant's IDS) (Year: 2019).*
(Continued)

*Primary Examiner* — Mang Hang Yeung
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive, from a base station, a configuration for periodic communications. The UE may determine that the UE has successfully received a respective initial transmission in each transmission cycle of a threshold number of transmission cycles associated with the periodic communications. The UE may deactivate repetitions in one or more transmission cycles based at least in part on the determination. Numerous other aspects are provided.

30 Claims, 10 Drawing Sheets

(51) Int. Cl.
*H04W 72/04* (2009.01)
*H04W 76/27* (2018.01)
*H04W 80/02* (2009.01)

(58) Field of Classification Search
CPC ... H04L 5/0091; H04L 5/0053; H04L 5/0044; H04L 5/006; H04L 5/0023; H04W 72/042; H04W 76/27; H04W 80/02; H04W 16/28; H04W 72/0446; H04W 4/70; H04B 7/0695
USPC .......................................................... 370/329
See application file for complete search history.

(56) References Cited

U.S. PATENT DOCUMENTS

| 2018/0110002 | A1 | 4/2018 | Kim et al. | |
| 2018/0115970 | A1* | 4/2018 | Chae | G08G 1/012 |
| 2018/0332501 | A1* | 11/2018 | Tseng | H04L 1/189 |
| 2020/0083991 | A1* | 3/2020 | Nader | H04L 1/1864 |

OTHER PUBLICATIONS

Huawei, et al., "PDSCH Reliability for URLLC", 3GPP Draft, 3GPP TSG RAN WG1 Ad Hoc Meeting, R1-1800058, 3rd Generation Partnership Project (3GPP), Mobile Competence Centre, 650, Route Des Lucioles, F-06921 Sophia-Antipolis Cedex, France, vol. RAN WG1, No. Vancouver, Canada; Jan. 22, 2018-Jan. 26, 2018, Jan. 13, 2018 (Jan. 13, 2018), 10 Pages, XP051384561, Retrieved from the Internet: URL: http://www.3gpp.org/ftp/tsg_ran/WG1_RL1/TSGR1_AH/NR_AH_1801/Docs/, [retrieved on Jan. 13, 2018], figure 7, the whole document.

International Search Report and Written Opinion—PCT/US2020/034004—ISAEPO—Jul. 30, 2020.

Sequans: "PDCCH Enhancements for URLLC", 3GPP Draft, 3GPP TSG RAN WG1 Ad-Hoc Meeting 1901, R1-1900680—DCI Enhancements,3rd Generation Partnership Project (3GPP), Mobile Competence Centre, 650, Route Des Lucioles, F-06921 Sophia-Antipolis Cedex, France, vol. RAN WG1. No. Taipei, Taiwan, Jan. 21, 2019-Jan. 25, 2019, Jan. 20, 2019 (Jan. 20, 2019), XP051593527, 7 pages, Retrieved from the Internet: URL: http://www.3gpp.org/ftp/Meetings%5F3GPP%5FSYNC/RAN1/Docs/R1%2D1900680%2Ezip, [retrieved on Jan. 20, 2019], the whole document.

International Search Report and Written Opinion—PCT/US2020/034004—ISAEPO—Jul. 26, 2021.

* cited by examiner

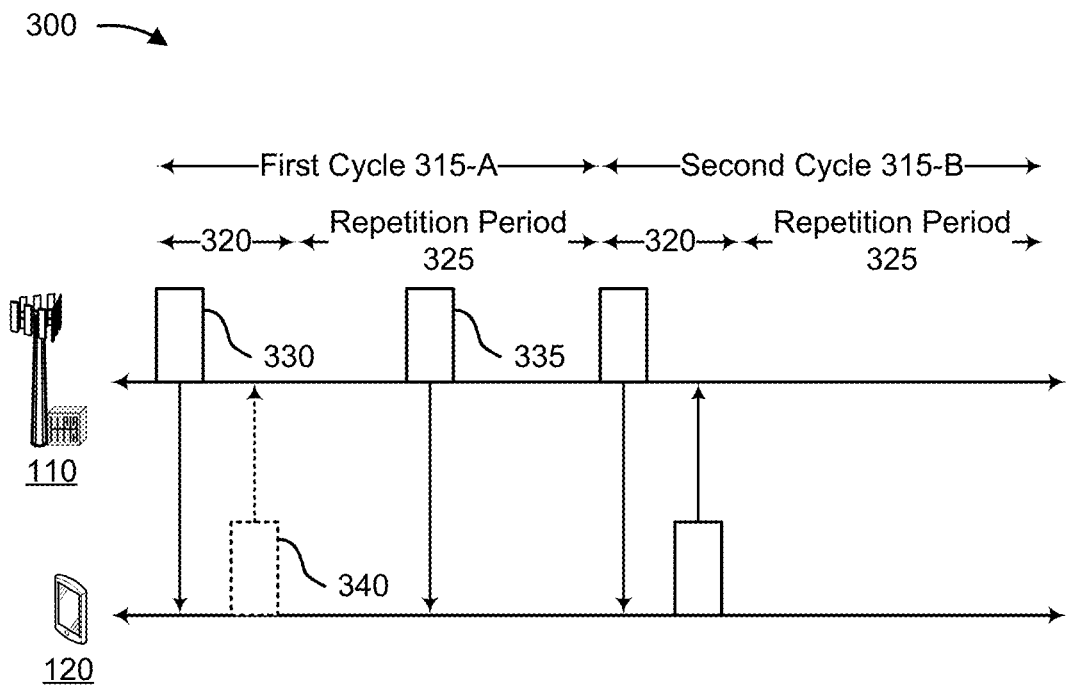
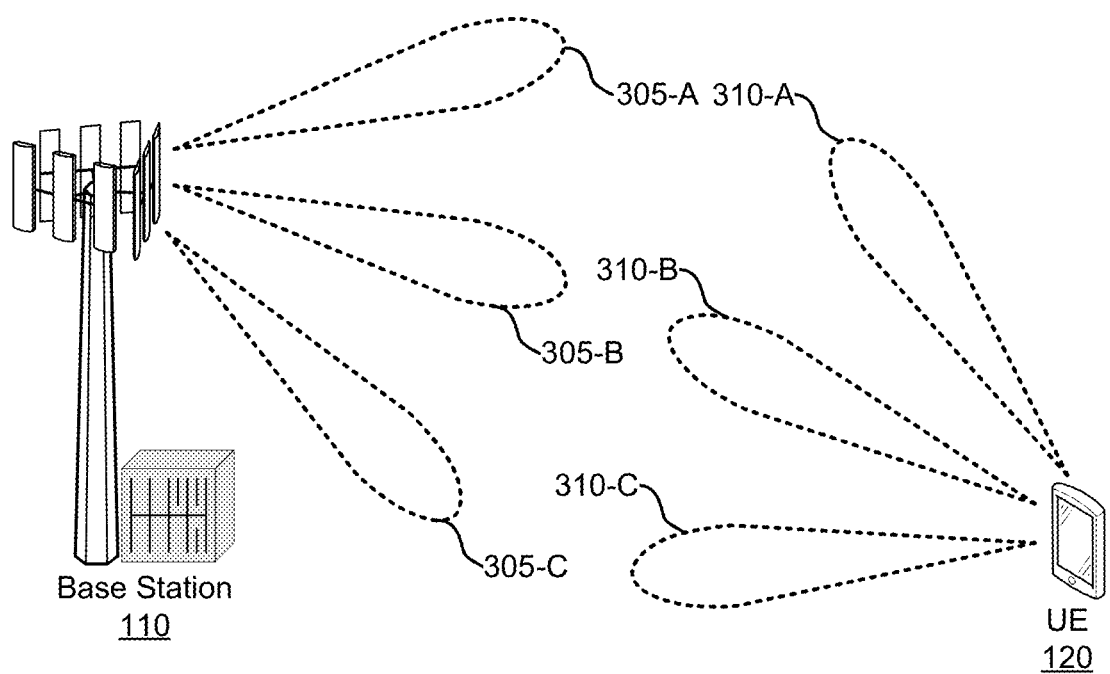
FIG. 3

DEACTIVATING RESOURCES FOR REPETITIONS OF PERIODIC COMMUNICATIONS

CROSS-REFERENCE TO RELATED APPLICATION

This Patent Application claims priority to U.S. Provisional Patent Application No. 62/870,418, filed on Jul. 3, 2019, entitled "DEACTIVATING RESOURCES FOR REPETITIONS OF PERIODIC COMMUNICATIONS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for deactivating resources for repetitions of periodic communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving, from a base station, a configuration for periodic communications; determining that the UE has successfully received a respective initial transmission in each transmission cycle of a threshold number of transmission cycles associated with the periodic communications; and deactivating repetitions in one or more transmission cycles based at least in part on the determination.

In some aspects, a method of wireless communication, performed by a base station, may include transmitting, to a UE, a configuration for periodic communications; determining that the base station has received a respective acknowledgement of an initial transmission in each transmission cycle of a threshold number of transmission cycles associated with the periodic communications; and deactivating repetitions in one or more transmission cycles based at least in part on the determination.

In some aspects, a method of wireless communication, performed by a wireless communication device, may include determining that the wireless communication device has successfully received a respective initial transmission in each transmission cycle of a threshold number of transmission cycles associated with periodic communications; and deactivating repetitions in one or more transmission cycles based at least in part on the determination.

In some aspects, a method of wireless communication, performed by a wireless communication device, may include determining that the wireless communication device has received a respective acknowledgement of an initial transmission in each transmission cycle of a threshold number of transmission cycles associated with periodic communications; and deactivating repetitions in one or more transmission cycles based at least in part on the determination.

In some aspects, a UE for wireless communication may include memory and one or more processors operatively coupled to the memory. The memory and the one or more processors may be configured to receive, from a base station, a configuration for periodic communications; determine that the UE has successfully received a respective initial transmission in each transmission cycle of a threshold number of transmission cycles associated with the periodic communications; and deactivate repetitions in one or more transmission cycles based at least in part on the determination.

In some aspects, a base station for wireless communication may include memory and one or more processors operatively coupled to the memory. The memory and the one or more processors may be configured to transmit, to a UE, a configuration for periodic communications; determine that the base station has received a respective acknowledgement of an initial transmission in each transmission cycle of a threshold number of transmission cycles associated with the periodic communications; and deactivate repetitions in one or more transmission cycles based at least in part on the determination.

In some aspects, a wireless communication device for wireless communication may include memory and one or more processors operatively coupled to the memory. The memory and the one or more processors may be configured to determine that the wireless communication device has successfully received a respective initial transmission in each transmission cycle of a threshold number of transmission cycles associated with periodic communications; and deactivate repetitions in one or more transmission cycles based at least in part on the determination.

In some aspects, a wireless communication device for wireless communication may include memory and one or more processors operatively coupled to the memory. The memory and the one or more processors may be configured to determine that the wireless communication device has received a respective acknowledgement of an initial transmission in each transmission cycle of a threshold number of transmission cycles associated with periodic communications; and deactivate repetitions in one or more transmission cycles based at least in part on the determination.

In some aspects, a non-transitory computer-readable medium may store one or more instructions for wireless communication. The one or more instructions, when executed by one or more processors of a UE, may cause the one or more processors to: receive, from a base station, a configuration for periodic communications; determine that the UE has successfully received a respective initial transmission in each transmission cycle of a threshold number of transmission cycles associated with the periodic communications; and deactivate repetitions in one or more transmission cycles based at least in part on the determination.

In some aspects, a non-transitory computer-readable medium may store one or more instructions for wireless communication. The one or more instructions, when executed by one or more processors of a base station, may cause the one or more processors to: transmit, to a UE, a configuration for periodic communications; determine that the base station has received a respective acknowledgement of an initial transmission in each transmission cycle of a threshold number of transmission cycles associated with the periodic communications; and deactivate repetitions in one or more transmission cycles based at least in part on the determination.

In some aspects, a non-transitory computer-readable medium may store one or more instructions for wireless communication. The one or more instructions, when executed by one or more processors of a wireless communication device, may cause the one or more processors to: determine that the wireless communication device has successfully received a respective initial transmission in each transmission cycle of a threshold number of transmission cycles associated with periodic communications; and deactivate repetitions in one or more transmission cycles based at least in part on the determination.

In some aspects, a non-transitory computer-readable medium may store one or more instructions for wireless communication. The one or more instructions, when executed by one or more processors of a wireless communication device, may cause the one or more processors to: determine that the wireless communication device has received a respective acknowledgement of an initial transmission in each transmission cycle of a threshold number of transmission cycles associated with periodic communications; and deactivate repetitions in one or more transmission cycles based at least in part on the determination.

In some aspects, an apparatus for wireless communication may include means for receiving, from a base station, a configuration for periodic communications; means for determining that the apparatus has successfully received a respective initial transmission in each transmission cycle of a threshold number of transmission cycles associated with the periodic communications; and means for deactivating repetitions in one or more transmission cycles based at least in part on the determination.

In some aspects, an apparatus for wireless communication may include means for transmitting, to a UE, a configuration for periodic communications; means for determining that the apparatus has received a respective acknowledgement of an initial transmission in each transmission cycle of a threshold number of transmission cycles associated with the periodic communications; and means for deactivating repetitions in one or more transmission cycles based at least in part on the determination.

In some aspects, an apparatus for wireless communication may include means for determining that the apparatus has successfully received a respective initial transmission in each transmission cycle of a threshold number of transmission cycles associated with periodic communications; and means for deactivating repetitions in one or more transmission cycles based at least in part on the determination.

In some aspects, an apparatus for wireless communication may include means for determining that the apparatus has received a respective acknowledgement of an initial transmission in each transmission cycle of a threshold number of transmission cycles associated with periodic communications; and means for deactivating repetitions in one or more transmission cycles based at least in part on the determination.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3 and 4 are diagrams illustrating examples of using beams for periodic communications, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
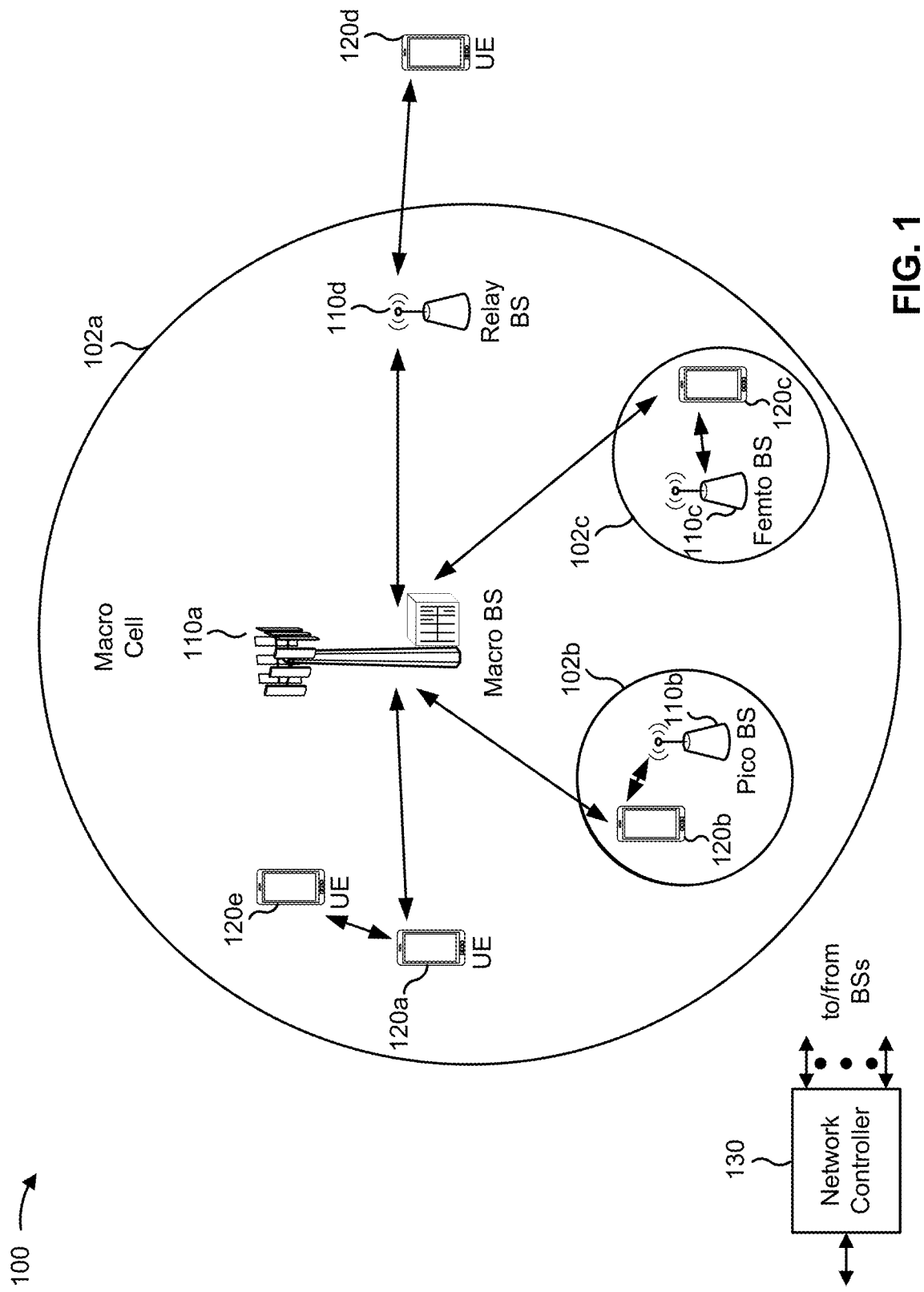
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
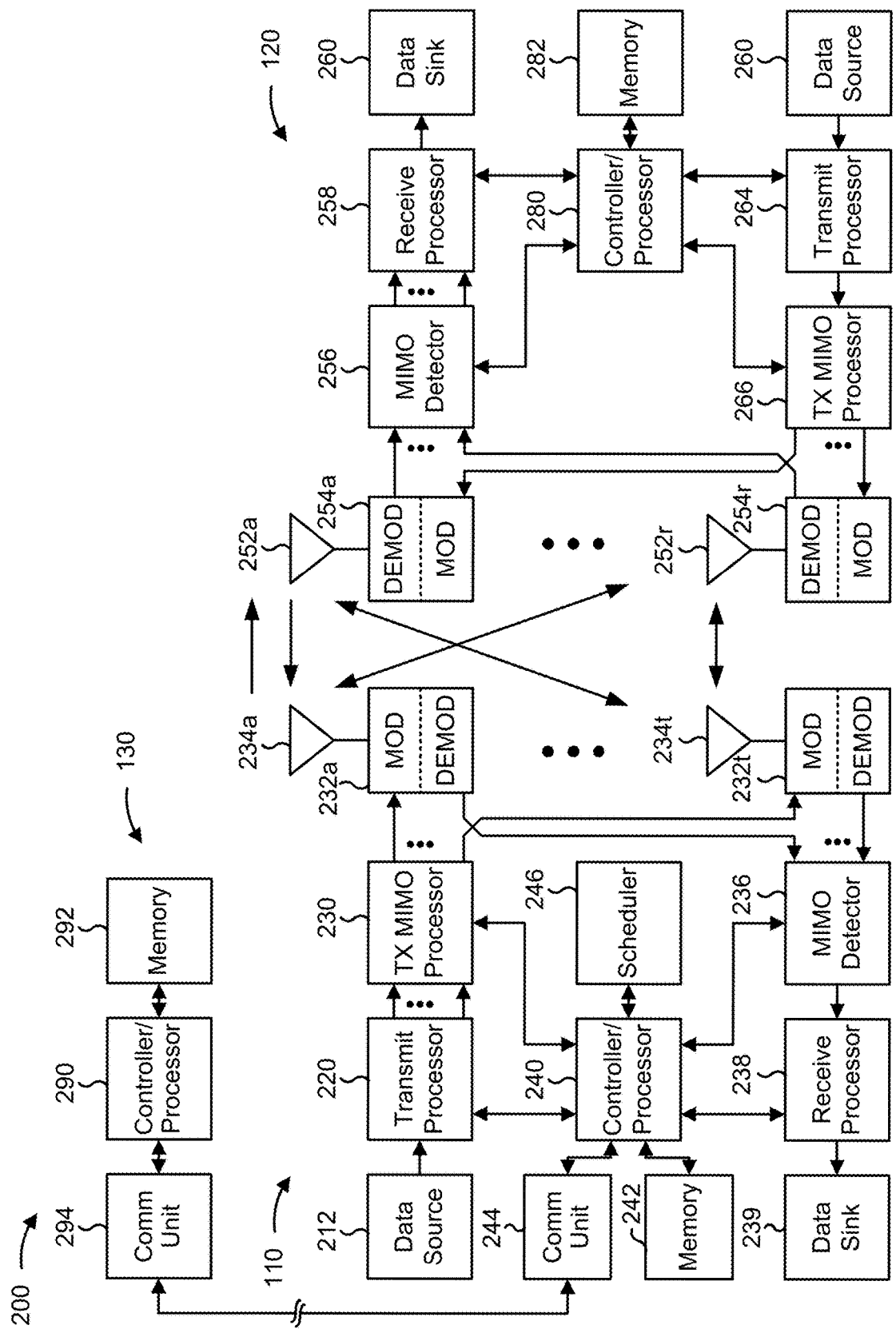
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-10. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with deactivating resources for repetition of periodic communications, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 700 of FIG. 7, process 800 of FIG. 8, process 900 of FIG. 9, process 1000 of FIG. 10, and/or other processes as described herein. A scheduler 246 may schedule UEs for data transmission on the downlink and/or uplink.

In some aspects, UE 120 may include means for receiving, from a base station, a configuration for periodic communications (e.g., using antenna 252, DEMOD 254, MIMO detector 256, receive processor 258, controller/processor 280, memory 282, and/or the like); means for determining that the UE 120 has successfully received a respective initial transmission in each transmission cycle of a threshold number of transmission cycles associated with the periodic communications (e.g., using controller/processor 280, memory 282, and/or the like); means for deactivating repetitions in one or more transmission cycles based at least in part on the determination (e.g., using receive processor 258, transmit processor 264, controller/processor 280, memory 282, and/or the like); and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, a configuration for periodic communications (e.g., using controller/processor 240, transmit processor 220, TX MIMO processor 230, MOD 232, antenna 234, and/or the like); means for determining that the base station 110 has received a respective acknowledgement of an initial transmission in each transmission cycle of a threshold number of transmission cycles associated with the periodic communications (e.g., using controller/processor 240, memory 242, and/or the like); means for deactivating repetitions in one or more transmission cycles based at least in part on the determination (e.g., using transmit processor 220, receive processor 238, controller/processor 240, memory 242, and/or the like); and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a wireless communication device (e.g., UE 120, base station 110, and/or the like) may include means for determining that the wireless communication device has successfully received a respective initial transmission in each transmission cycle of a threshold number of transmission cycles associated with periodic communications (e.g., using controller/processor 240, memory 242, controller/processor 280, memory 282, and/or the like); means for deactivating repetitions in one or more transmission cycles based at least in part on the determination (e.g., using transmit processor 220, receive processor 238, controller/processor 240, memory 242, receive processor 258, transmit processor 264, controller/processor 280, memory 282, and/or the like); and/or the like. Additionally, or alternatively, the wireless communication device may include means for determining that the wireless communication device has received a respective acknowledgement of an initial transmission in each transmission cycle of a threshold number of transmission cycles associated with periodic communications (e.g., using controller/processor 240, memory 242, controller/processor 280, memory 282, and/or the like); means for deactivating repetitions in one or more transmission cycles based at least in part on the determination (e.g., using transmit processor 220, receive processor 238, controller/processor 240, memory 242, receive processor 258, transmit processor 264, controller/processor 280, memory 282, and/or the like); and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

FIG. 3 is a diagram illustrating an example 300 of using beams for periodic communications, in accordance with various aspects of the present disclosure.

As shown in FIG. 3, a UE 120 and a base station 110 may communicate using beamformed transmissions. For example, the base station 110 may directionally transmit and/or monitor using one or more beams 305 (shown as beams 305-A, 305-B, and 305-C), and the UE 120 may directionally transmit and/or monitor using one or more beams 310 (shown as beams 310-A, 310-B, and 310-C). A downlink beam may be used for communications from the base station 110 to the UE 120, and an uplink beam may be used for communications from the UE 120 to the base station 110. A beam may include a transmit beam, a receive beam, and/or the like.

The base station 110 and the UE 120 may support configurations for periodic communications, such as semi-persistent scheduling (SPS) communications, configured grant (CG) communications, and/or the like. For SPS communications, the base station 110 and the UE 120 may be configured with periodic resources (e.g., time resources, frequency resources, spatial resources, and/or the like) for downlink transmissions. The resources may be configured in a radio resource control (RRC) message or a similar type of message that includes an SPS configuration. In this case, the base station 110 does not need to transmit a downlink grant (e.g., in downlink control information (DCI), a physical downlink control channel (PDCCH), and/or the like) to allocate resources to the UE 120 for downlink transmissions (e.g., initial downlink transmissions), thereby reducing latency and conserving network resources. In some aspects, downlink grants may be used for repetitions in SPS.

For CG communications, a base station 110 and a UE 120 may be configured with periodic resources for uplink transmissions. Similar to SPS communications, the resources may be configured in an RRC message or a similar type of message that includes a CG configuration. In this case, the UE 120 does not need to request and the base station 110 does not need to transmit an uplink grant (e.g., in DCI, a PDCCH, and/or the like) to allocate resources to the UE 120 for uplink transmissions, thereby reducing latency and conserving network resources. In some aspects, uplink grants may be used for repetitions in CG.

As shown in FIG. 3, a wireless communication device (e.g., a base station 110, a UE 120, and/or the like) may be configured with periodic resources based at least in part on a recurring transmission cycle 315, shown as a first transmission cycle 315-A and a second transmission cycle 315-B. The duration and timing of a transmission cycle may be configured according to a periodic communication configuration, such as an SPS configuration, a CG configuration, and/or the like. For example, a transmission cycle duration may correspond to a periodicity of an SPS configuration, a CG configuration, and/or the like.

As further shown, a transmission cycle 315 may include a first time period 320 and a second time period 325. The first time period may be referred to as an initial transmission window. The second time period may be referred to as a repetition window. In this case, the base station 110 (e.g., for SPS) or the UE 120 (e.g., for CG) may transmit an initial transmission in the first time period 320 of the transmission cycle 315, and the base station 110 (e.g., for SPS) or the UE 120 (e.g., for CG) may transmit one or more repetitions in the second time period 325 of the transmission cycle 315. In some cases, the one or more repetitions may be transmitted regardless of whether the initial transmission was successful (e.g., to improve reliability using repetitions of the initial transmission). In other cases, the one or more repetitions may be transmitted only if the initial transmission was not successful (e.g., if a negative acknowledgement (NACK) is transmitted or received for the initial transmission). The initial transmission window and the repetition window may occur in a transmission cycle 315 (e.g., transmission cycle 315-A) prior to occurrence of a next consecutive transmission cycle 315 (e.g., transmission cycle 315-B). In some aspects, initial transmissions in an initial transmission window may be scheduled in an RRC message (e.g., according to an SPS configuration and/or a CG configuration), without using DCI to schedule the initial transmissions (although activation DCI may be used to activate or deactivate the initial transmissions). In some aspects, repetitions in a repetition window may be scheduled using DCI. In some aspects, repetitions may be referred to as retransmissions.

For example, using SPS, the base station 110 may transmit a periodic downlink communication, such as a physical downlink shared channel (PDSCH) communication 330, to the UE 120 within a first time period 320 of a first transmission cycle 315-A, as shown. If the PDSCH communication 330 fails, then the base station 110 may repeat (e.g., retransmit) the PDSCH communication, shown as a repetition 335, in the second time period 325 of a first transmission cycle 315-A, as shown. In some aspects, the UE 120 may transmit (and the base station 110 may receive) a NACK 340, corresponding to the PDSCH communication 330, to indicate that the PDSCH communication 330 has failed. Alternatively, the UE 120 may not transmit an acknowledgement (ACK) or a NACK (e.g., may refrain from transmitting ACK or NACK (ACK/NACK) feedback) corresponding to the PDSCH communication 330, thereby indicating that the PDSCH communication 330 has failed.

As another example, using CG, the UE 120 may transmit a periodic uplink communication, such as a physical uplink shared channel (PUSCH) communication (not shown), to the base station 110 within a first time period 320 of a first transmission cycle 315-A. If the PUSCH communication fails, then the UE 120 may repeat (e.g., retransmit) the PUSCH communication (e.g., a repetition, sometimes referred to as a retransmission) in the second time period 325 of the first transmission cycle 315-A. In some aspects, the base station 110 may transmit (and the UE 120 may receive) a NACK, corresponding to the PUSCH communication, to indicate that the PUSCH communication has failed. Alternatively, the base station 110 may not transmit an ACK or a NACK (e.g., may refrain from transmitting ACK/NACK feedback) corresponding to the PUSCH communication, indicating that the PUSCH communication has failed.

In some aspects, periodic communications, such as SPS communications and/or CG communications, may be transmitted or received using beamforming. For example, the base station 110 may transmit a PDSCH communication to the UE 120 using a first beam 305-B, and the UE 120 may monitor for the transmission using a corresponding first beam 310-B. In some cases, a beam (or beam pair) used for periodic communications may be updated. For example, if a periodic transmission from the base station 110 using the first beam 305-B fails, then the active beam used for downlink periodic transmissions may be updated to another beam, such as a second beam 305-A. The second beam 305-A may have a stronger signal strength at the UE 120 than the first beam 305-B.

As indicated above, FIG. 3 is provided as an example. Other examples may differ from what is described with regard to FIG. 3.

Figure 4:
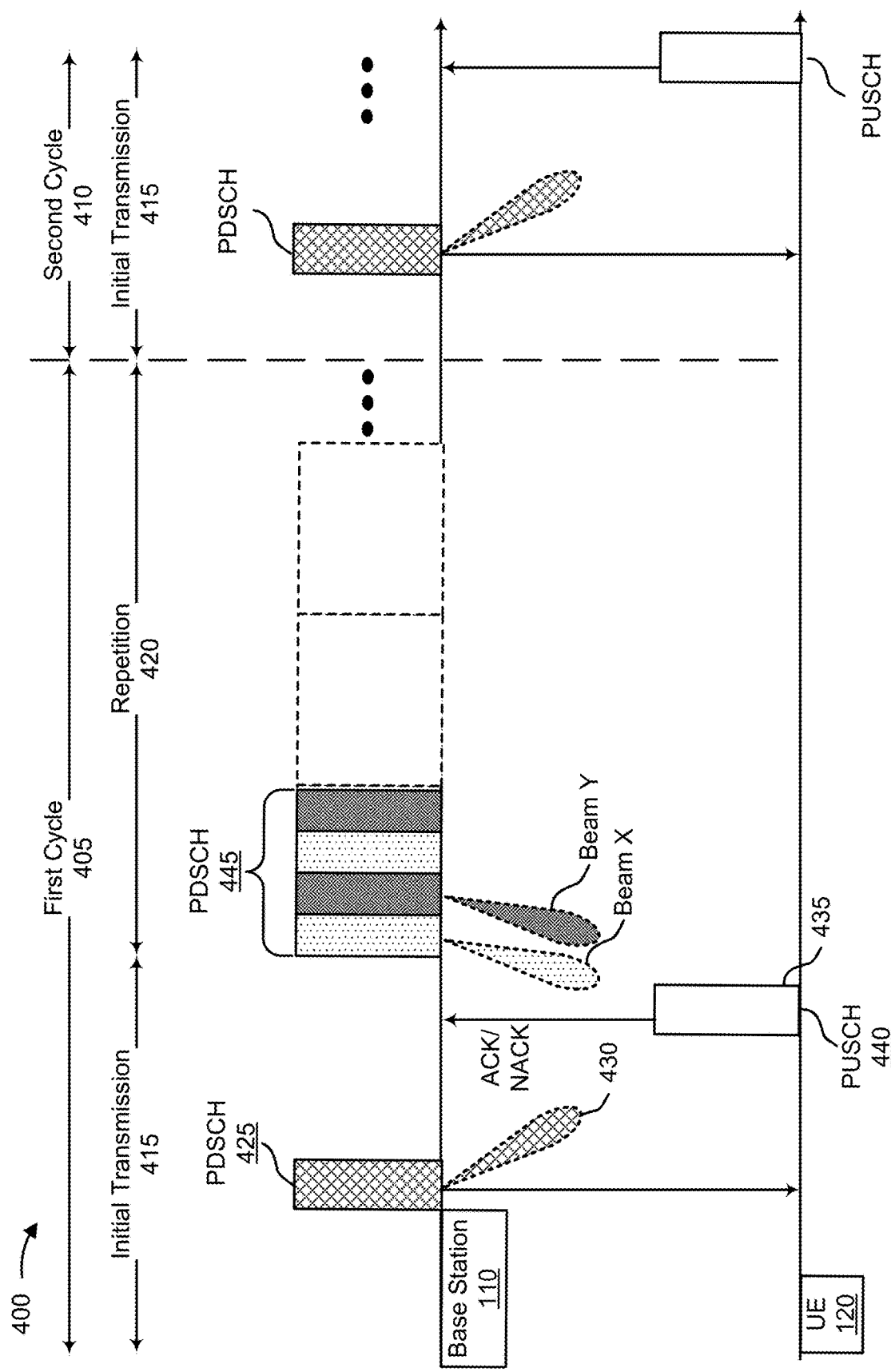

FIG. 4 is a diagram illustrating an example 400 of using beams for periodic communications, in accordance with various aspects of the present disclosure. As shown in FIG. 4, a base station 110 and a UE 120 may communicate with one another.

As described above in connection with FIG. 3, the base station 110 and the UE 120 may support periodic communications (e.g., SPS communications, CG communications, and/or the like), and may be configured with periodic resources for the periodic communications. The periodic resources may be configured in recurring transmission cycles as described above in connection with FIG. 3, shown in FIG. 4 as a first cycle 405 and a second cycle 410. A transmission cycle may include a first time period, shown as an initial transmission window 415, and a second time period, shown as a repetition window 420. The base station 110 (e.g., for SPS) or the UE 120 (e.g., for CG) may transmit an initial transmission in the initial transmission window 415 of a transmission cycle, and the base station 110 (e.g., for SPS) or the UE 120 (e.g., for CG) may transmit one or more repetitions in the repetition window 420 of the transmission cycle. In some aspects, multiple repetitions may be transmitted in the repetition window 420 using multiple beams (e.g., one repetition on each beam), such as by employing beam-sweeping.

As shown by reference number 425, using SPS, the base station 110 may transmit an initial PDSCH communication to the UE 120 within the initial transmission window 415 of the first cycle 405. As shown by reference number 430, the base station 110 may transmit, and the UE 120 may receive, the initial PDSCH communication using a first beam. The first beam may include a downlink transmit (TX) beam of the base station 110 and/or a corresponding downlink receive (RX) beam of the UE 120. In some aspects, the first beam may be included in a set of beams configured as candidates for communication between the UE 120 and the base station 110.

As shown by reference number 435, the UE 120 may indicate, to the base station 110, whether the initial PDSCH communication has succeeded or has failed. In some aspects, the UE 120 may indicate that the initial PDSCH communication has succeeded by transmitting an acknowledgement (ACK) corresponding to the initial PDSCH communication. In some aspects, the UE 120 may indicate that the initial PDSCH communication has failed by transmitting a NACK corresponding to the initial PDSCH communication. For example, as shown by reference number 440, the UE 120 may transmit an ACK or a NACK (shown as ACK/NACK, sometimes referred to as ACK/NACK feedback) in a PUSCH communication. In this case, the base station 110 may determine that the initial PDSCH communication has failed based at least in part on receiving a NACK, or may determine that the initial PDSCH communication has succeeded based at least in part on receiving an ACK. In some aspects, the UE 120 may indicate that the initial PDSCH communication has failed by refraining from transmitting ACK/NACK feedback corresponding to the initial PDSCH communication. In this case, the base station 110 may determine that the initial PDSCH communication has failed based at least in part on failing to receive ACK/NACK feedback corresponding to the initial PDSCH communication.

As shown by reference number 445, the base station 110 may repeat (e.g., retransmit) the initial PDSCH communication on a set of beams, shown as Beam X and Beam Y. For example, the base station 110 may repeat (e.g., retransmit) the PDSCH communication (e.g., using beam-sweeping) on a set of beams configured as candidates for communication between the UE 120 and the base station 110. As shown, the repetitions may occur in the repetition window 420 of the first cycle 405. In some aspects, resources for periodic communications in the initial transmission window 415 may be allocated using a configuration (e.g., in an RRC message) without using DCI. In some aspects, resources for repetitions of periodic communications may be allocated using DCI, such as DCI carried in a PDCCH.

The repetitions during the repetition window 420 may assist the UE 120 with receiving the PDSCH communication. For example, if the initial PDSCH communication failed, then the repetitions may enable the UE 120 to receive the PDSCH communication despite failure of the initial PDSCH communication. If the initial PDSCH communication was successful, then the UE 120 may combine one or more repetitions with the initial PDSCH communication to improve decoding accuracy. This may assist with satisfying a requirement associated with the PDSCH communication, such as a latency requirement, a reliability requirement, and/or the like. For example, the PDSCH communication may be an ultra-reliable low latency communication (URLLC), and the repetitions (sometimes referred to as retransmissions) during the repetition window 420 may assist with satisfying stringent URLLC requirements.

However, in some cases, if the UE 120 successfully receives the initial PDSCH communication, then the repetitions may waste resources despite providing improved reliability. For example, the repetitions may consume network resources (e.g., time, frequency, and/or spatial resources) that could be used for other communications, may consume resources of the base station 110 used to process and transmit the repetitions (e.g., memory resources, processor resources, and/or the like), may consume resources of the UE 120 used to receive and process the repetitions (e.g., memory resources, processor resources, and/or the like), and/or the like. Some techniques and apparatuses described herein conserve network resources, base station resources, UE resources, and/or the like by deactivating repetitions in certain scenarios, such as when the UE 120 successfully receives one or more initial transmissions.

As indicated above, FIG. 4 is provided as an example. Other examples may differ from what is described with regard to FIG. 4.

Figure 5:
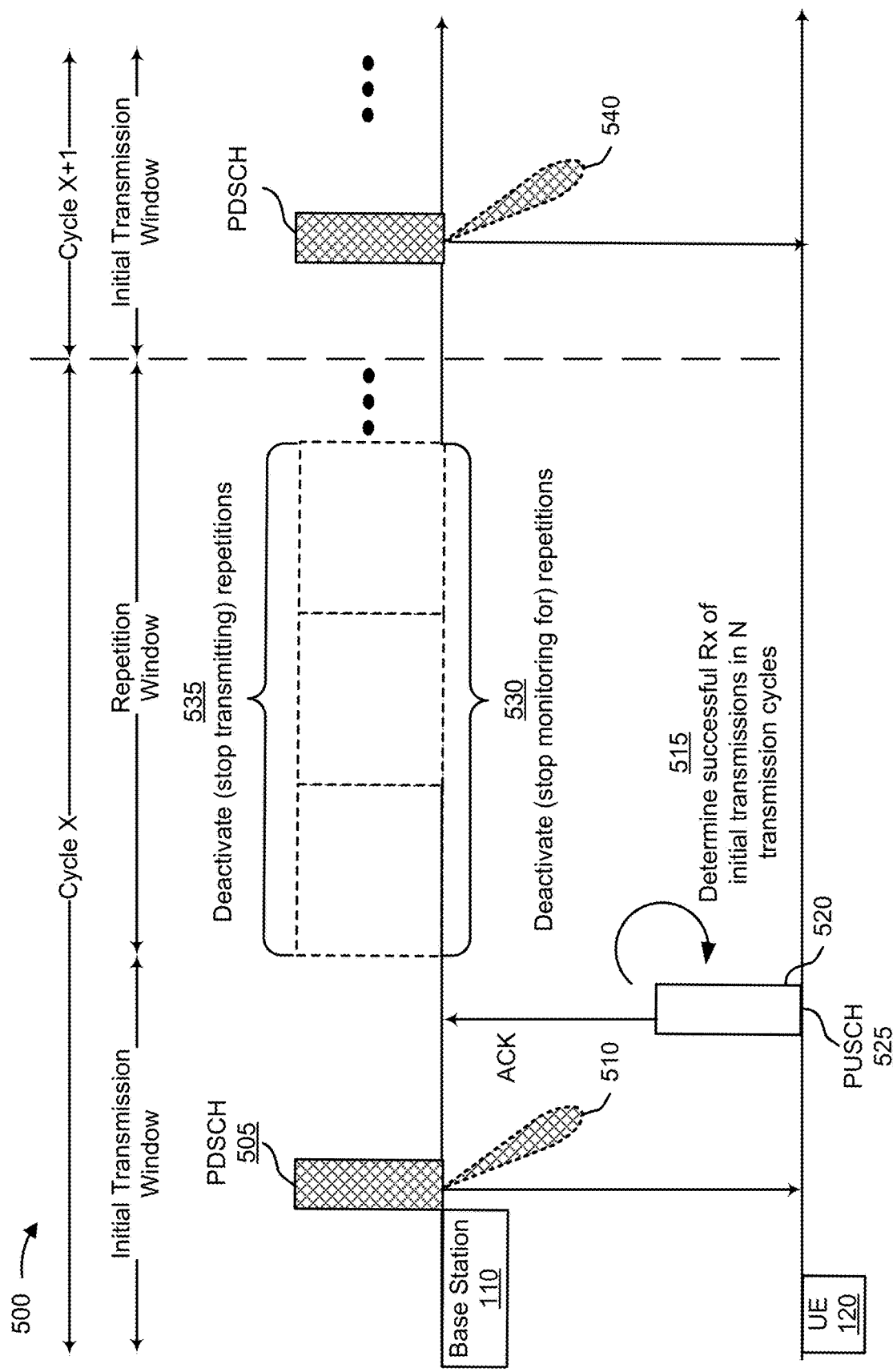
FIG. 5 is a diagram illustrating an example of deactivating resources for repetition of periodic communications, in accordance with various aspects of the present disclosure.

FIG. 5 is a diagram illustrating an example 500 of deactivating resources for repetition of periodic communications, in accordance with various aspects of the present disclosure. As shown in FIG. 5, a base station 110 and a UE 120 may communicate with one another.

As described above in connection with FIG. 3 and FIG. 4, the base station 110 and the UE 120 may support periodic communications (e.g., SPS communications, CG communications, and/or the like), and may be configured with periodic resources for the periodic communications. The periodic resources may be configured in recurring transmission cycles as described above in connection with FIG. 3 and FIG. 4, shown in FIG. 5 as Cycle X and Cycle X+1. A transmission cycle may include a first time period, shown as an initial transmission window, and a second time period, shown as a repetition window. The base station 110 (e.g., for SPS) or the UE 120 (e.g., for CG) may transmit an initial transmission in the initial transmission window of a transmission cycle, and the base station 110 (e.g., for SPS) or the UE 120 (e.g., for CG) may transmit one or more repetitions in the repetition window of the transmission cycle. In some aspects, multiple repetitions may be transmitted in the repetition window using multiple beams (e.g., one repetition on each beam), such as by employing beam-sweeping. In some aspects, the repetitions may be transmitted via multi-beam transmission (e.g., beam-sweeping).

In some aspects, the base station 110 may transmit, to the UE 120, a configuration for periodic communications, such as SPS communications, CG communications, and/or the like. The periodic communications may include uplink communications and/or downlink communications. The configuration may indicate a set of resources for the periodic communications (e.g., time resources, frequency resources, spatial resources, and/or the like), a periodicity of the periodic communications, and/or the like. In some aspects, the configuration may be indicated in an RRC message, activation DCI, and/or the like. In some aspects, a duration, a timing, and/or a periodicity of a transmission cycle may be based at least in part on the configuration. For example, a transmission cycle duration may correspond to a periodicity of an SPS configuration, a CG configuration, and/or the like.

As shown by reference number 505, using SPS, the base station 110 may transmit an initial PDSCH communication to the UE 120 within the initial transmission window of the Cycle X. As shown by reference number 510, the base station 110 may transmit, and the UE 120 may receive, the initial PDSCH communication using a first beam. The first beam may include a downlink TX beam of the base station 110 and/or a corresponding downlink RX beam of the UE 120. In some aspects, the first beam may be included in a set of beams configured as candidates for communication between the UE 120 and the base station 110.

As shown by reference number 515, the UE 120 may successfully receive the initial PDSCH communication, and may determine that a deactivation condition is satisfied. For example, the UE 120 may determine that the deactivation condition is satisfied based at least in part on determining that the UE 120 has successfully received initial transmissions (e.g., respective initial transmissions) in each transmission cycle of a threshold number (shown as N) of transmission cycles. As such, the UE 120 may determine that the deactivation condition is satisfied based at least in part on determining that the UE 120 has successfully received initial transmissions in Cycle X as well as N−1 cycles prior to Cycle X. In some aspects, Cycle X and the N−1 cycles may be consecutive cycles for more robustness. However, in some aspects, Cycle X and the N−1 cycles may be non-consecutive. As an example, if the threshold number of cycles is one, then the UE 120 may determine that the UE 120 successfully received an initial transmission in an initial transmission window of Cycle X. As another example, if the threshold number of cycles is two, then the UE 120 may determine that the UE 120 successfully received an initial transmission in an initial transmission window of Cycle X−1 (e.g., a transmission cycle prior to Cycle X) and that the UE 120 successfully received an initial transmission in an initial transmission window of Cycle X.

In some aspects, the threshold number is one. In some aspects, the threshold number is greater than one. In some aspects, the threshold number is indicated in the configuration for periodic communications. In some aspects, the threshold number of transmission cycles includes multiple consecutive transmission cycles. In some aspects, one or more transmission cycles in the threshold number of transmission cycles are non-consecutive. In some aspects, the threshold number depends on a mobility associated with the UE 120 (e.g., a higher threshold number for a higher level of mobility, and/or a lower threshold number for a lower level of mobility), a coherence time or stability of a channel used for communication between the UE 120 and the base station 110 (e.g., a higher threshold number for a higher coherence time or lower stability, and/or a lower threshold number for a lower coherence time or higher stability), and/or the like.

As shown by reference number 520, the UE 120 may indicate that the initial PDSCH communication has succeeded by transmitting an ACK corresponding to the initial PDSCH communication to the base station 110. For example, as shown by reference number 525, the UE 120 may transmit the ACK in a PUSCH communication. In some aspects, one or more resources for the PUSCH communication may be configured according to a configuration for periodic communications. In this case, the base station 110 may determine that the initial PDSCH communication has succeeded based at least in part on receiving an ACK. The UE 120 may determine that the deactivation condition is satisfied based at least in part on determining that the UE 120 has transmitted a threshold number of ACKs for respective initial transmissions in each transmission cycle of the threshold number of transmission cycles. As an example, if the threshold number of cycles is one, then the UE 120 may determine that the UE 120 transmitted an ACK of an initial transmission in an initial transmission window of Cycle X. As another example, if the threshold number of cycles is two, then the UE 120 may determine that the UE 120 transmitted an ACK of an initial transmission in an initial transmission window of Cycle X−1 (e.g., a transmission cycle prior to Cycle X) and that the UE 120 transmitted an ACK of an initial transmission in an initial transmission window of Cycle X.

Additionally, or alternatively, the UE 120 may determine that the deactivation condition is satisfied based at least in part on determining that a link quality between the UE 120 and the base station 110 satisfies a threshold. For example, the UE 120 may determine that a measured reference signal receive power (RSRP) parameter, a measure reference signal received quality (RSRQ) parameter, a signal-to-interference-plus-noise ratio (SINR) parameter, and/or the like, satisfies the threshold.

As shown by reference number 530, the UE 120 may deactivate repetitions in one or more transmission cycles based at least in part on determining that the deactivation condition is satisfied. For example, the UE 120 may deactivate repetitions by refraining from monitoring for repetitions. In some aspects, the UE 120 may deactivate repetitions starting in a repetition window of the same transmission cycle in which the UE 120 determined that the deactivation condition is satisfied (e.g., starting in Cycle X in FIG. 5, as shown). In some aspects, the UE 120 may deactivate repetitions starting in a subsequent transmission cycle (e.g., Cycle X+1, Cycle X+2, and/or the like) after the transmission cycle in which the UE 120 determined that the deactivation condition is satisfied, such as when the UE 120 does not have sufficient time to determine that the deactivation condition is satisfied before deactivating the repetitions. For example, the UE 120 may deactivate repetitions starting in a next consecutive transmission cycle (e.g., starting in Cycle X+1 in FIG. 5). The repetitions may include one or more PDCCH communications (e.g., DCI that schedules one or more PDSCH repetitions) and/or one or more PDSCH communications.

In some aspects, repetitions that occur at the same time as an initial transmission may be deactivated (e.g., at the same time but on a different frequency resource, a different beam, and/or the like). In this case, repetitions in an initial transmission window may be deactivated (or the concept of a separate initial transmission window and a repetition window may not apply). Additionally, or alternatively, repetitions that occur at a different time (e.g., later than) an initial transmission may be deactivated. In this case, repetitions in a repetition window may be deactivated. Additionally, or alternatively, repetitions that occur using beam-sweeping may be deactivated.

As shown by reference number 535, the base station 110 may deactivate repetitions in one or more transmission cycles based at least in part on determining that the deactivation condition is satisfied. For example, the base station 110 may deactivate repetitions by refraining from transmitting repetitions. In some aspects, the base station 110 may deactivate repetitions starting in a repetition window of the same transmission cycle in which the base station 110 determined that the deactivation condition is satisfied (e.g., starting in Cycle X in FIG. 5, as shown). In some aspects, the base station 110 may deactivate repetitions starting in a subsequent transmission cycle (e.g., Cycle X+1, Cycle X+2, and/or the like) after the transmission cycle in which the base station 110 determined that the deactivation condition is satisfied, such as when the base station 110 does not have sufficient time to determine that the deactivation condition is satisfied before deactivating the repetitions. For example, the base station 110 may deactivate repetitions starting in a next consecutive transmission cycle (e.g., starting in Cycle X+1 in FIG. 5).

In some aspects, the deactivation condition for the base station 110 may include determining that the base station 110 has received a respective ACK of an initial transmission in each transmission cycle of a threshold number of transmission cycles associated with the periodic communications, in a similar manner as described above in connection with the UE 120. Additionally, or alternatively, the base station 110 may determine that the deactivation condition is satisfied based at least in part on determining that a link quality between the UE 120 and the base station 110 satisfies a threshold. As indicated above, the link quality may be represented by an RSRP parameter, an RSRQ parameter, a SINR parameter, and/or the like. One or more of these parameters may be measured by the UE 120 and/or the base station 110, and/or may be signaled between the UE 120 and the base station 110.

In some aspects, the UE 120 may determine that the deactivation condition is satisfied and may transmit, to the base station 110, a request to deactivate repetitions. The request may be transmitted in uplink control information (UCI), a media access control (MAC) control element (CE) (MAC-CE), an RRC message, and/or the like. In this case, the base station 110 may determine that the deactivation condition is satisfied based at least in part on receiving the request.

In some aspects, the base station 110 may determine that the deactivation condition is satisfied and may transmit, to the UE 120, an instruction to deactivate (e.g., to refrain from monitoring for) the repetitions. The instruction may be transmitted in DCI, a MAC-CE, an RRC message, and/or the like. In this case, the UE 120 may determine that the deactivation condition is satisfied based at least in part on receiving the instruction.

Thus, in some aspects, the base station 110 and the UE 120 may independently determine that the deactivation condition is satisfied, without requiring signaling to indicate the deactivation, thereby reducing signaling overhead. In some aspects, only the base station 110 may independently determine that the deactivation condition is satisfied, and may signal the UE 120 to deactivate repetitions, thereby conserving resources of the UE 120 that would otherwise be used for an independent determination. In some aspects, only the UE 120 may independently determine that the deactivation condition is satisfied, and may signal the base station 110 to deactivate repetitions, thereby conserving resources of the base station 110 that would otherwise be used for an independent determination.

In some aspects, the UE 120 may communicate with multiple base stations 110 (e.g., multiple transmit receive points (TRPs), such as TRPs of a single base station 110 or multiple base stations 110). For example, the UE 120 may receive independent initial transmissions or joint initial transmissions from multiple base stations 110 in the initial transmission window. Additionally, or alternatively, the UE 120 may receive independent repetitions or joint repetitions from multiple base stations 110 in the repetition window. In these cases, upon determining that a deactivation condition is satisfied, one or more of the multiple base stations 110 may deactivate initial transmission and/or repetitions. For example, if the UE 120 was receiving initial transmissions from multiple base stations 110, all but one of those base stations 110 may deactivate initial transmissions to conserve network resources based at least in part on a determination that the deactivation condition is satisfied. Additionally, or alternatively, all of the multiple base stations 110 may deactivate repetitions based at least in part on a determination that the deactivation condition is satisfied. In some aspects, one of the base stations 110 may instruct one or more other base stations 110 to deactivate initial transmissions and/or repetitions.

In some aspects, the UE 120 and/or the base station 110 may deactivate repetitions for a single transmission cycle. In some aspects, the UE 120 and/or the base station 110 may deactivate repetitions for multiple transmission cycles. In some aspects, the UE 120 and/or the base station 110 may activate (or reactivate) repetitions based at least in part on determining that an activation condition is satisfied, as described in more detail below in connection with FIG. 6.

Although FIG. 5 shows operations associated with SPS, similar operations may occur in CG. For example, the UE 120 may transmit an initial PUSCH communication to the base station 110 within the initial transmission window of the Cycle X (e.g., on a first beam). The base station 110 may successfully receive the initial PUSCH communication and may determine that a deactivation condition is satisfied. For example, the base station 110 may determine that the deactivation condition is satisfied by determining that the base station 110 has successfully received initial transmissions (e.g., respective initial transmissions) in each transmission cycle of a threshold number (shown as N) of transmission cycles, in a similar manner as described above. Based at least in part on determining that the deactivation condition is satisfied, the base station 110 may deactivate (e.g., refrain from monitoring for) repetitions. The base station 110 may indicate that the initial PUSCH communication has succeeded by transmitting an ACK corresponding to the initial PUSCH communication to the UE 120. The UE 120 may determine that the deactivation condition is satisfied, such as by determining that the UE 120 has received a respective ACK of an initial transmission in each transmission cycle of a threshold number of transmission cycles associated with the periodic communications, in a similar manner as described above. Based at least in part on determining that the deactivation condition is satisfied, the UE 120 may deactivate (e.g., refrain from transmitting) repetitions. By deactivating repetitions, the UE 120 and/or the base station 110 may conserve network resources, base station resources, UE resources, and/or the like.

As indicated above, FIG. 5 is provided as an example. Other examples may differ from what is described with regard to FIG. 5.

Figure 6:
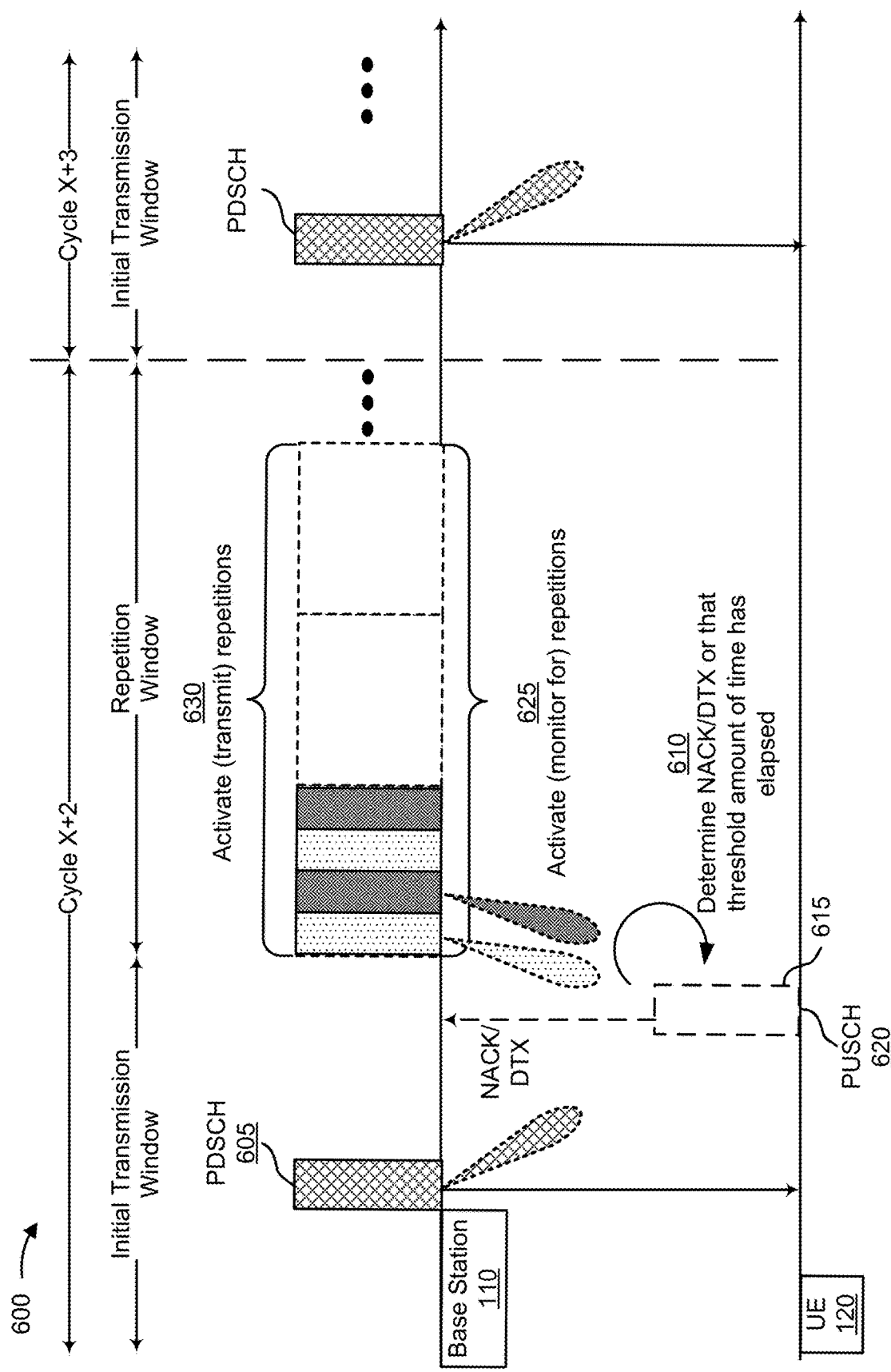
FIG. 6 is a diagram illustrating an example of activating resources for repetition of periodic communications, in accordance with various aspects of the present disclosure.

FIG. 6 is a diagram illustrating an example 600 of activating resources for repetition of periodic communications, in accordance with various aspects of the present disclosure.

In the example depicted in FIG. 6, the UE 120 and the base station 110 have deactivated repetitions starting in Cycle X and continuing in Cycle X+1, as described above in connection with FIG. 5. As shown by reference number 605, using SPS, the base station 110 may transmit an initial PDSCH communication (e.g., on a first beam) to the UE 120 within the initial transmission window of Cycle X+2 (e.g., a next consecutive cycle after cycle X+1).

As shown by reference number 610, the UE 120 may determine that the initial PDSCH communication was not successfully received, and may determine that an activation condition is satisfied. For example, the UE 120 may determine that the activation condition is satisfied based at least in part on determining that the initial PDSCH communication was not successfully received. The determination that the activation condition is satisfied may be a subsequent determination that occurs after deactivating the repetitions, such as according to deactivating repetitions as described above in connection with FIG. 5.

As shown by reference number 615, the UE 120 may indicate that the initial PDSCH communication has failed. In some aspects, the UE 120 may indicate that the initial PDSCH communication has failed by transmitting a NACK corresponding to the initial PDSCH communication. For example, as shown by reference number 620, the UE 120 may transmit a NACK in a PUSCH communication. In this case, the base station 110 may determine that the initial PDSCH communication has failed based at least in part on receiving the NACK. In some aspects, the UE 120 may indicate that the initial PDSCH communication has failed by refraining from transmitting ACK/NACK feedback corresponding to the initial PDSCH communication (shown as discontinuous transmission or DTX). In this case, the base station 110 may determine that the initial PDSCH communication has failed based at least in part on failing to receive ACK/NACK feedback corresponding to the initial PDSCH communication.

As shown by reference number 625, the UE 120 may activate (e.g., reactivate) repetitions in one or more transmission cycles based at least in part on determining that the activation condition is satisfied. For example, the UE 120 may activate repetitions (e.g., via multi-beam transmission) by monitoring for repetitions. In some aspects, the one or more transmission cycles in which the repetitions are activated (e.g., Cycle X+2) may be subsequent to one or more transmission cycles in which the repetitions were deactivated (e.g., Cycle X and Cycle X+1). In some aspects, the UE 120 may activate repetitions starting in a repetition window of the same transmission cycle in which the UE 120 determined that the activation condition is satisfied (e.g., starting in Cycle X+2 in FIG. 6, as shown). In some aspects, the UE 120 may activate repetitions starting in a subsequent transmission cycle (e.g., Cycle X+3, Cycle X+4, and/or the like) after the transmission cycle in which the UE 120 determined that the activation condition is satisfied, such as when the UE 120 does not have sufficient time to determine that the activation condition is satisfied before activating the repetitions. For example, the UE 120 may activate repetitions starting in a next consecutive transmission cycle (e.g., starting in Cycle X+3 in FIG. 6).

As shown by reference number 630, the base station 110 may activate repetitions in one or more transmission cycles based at least in part on determining that the activation condition is satisfied. For example, the base station 110 may activate repetitions by transmitting repetitions. In some aspects, the base station 110 may activate repetitions starting in a repetition window of the same transmission cycle in which the base station 110 determined that the activation condition is satisfied, or in a later transmission cycle, as described above. In some aspects, the activation condition may include determining that the base station 110 has received a NACK of an initial transmission.

Additionally, or alternatively, the activation condition for the UE 120 and/or the base station 110 may include determining that a threshold amount of time has elapsed after deactivating repetitions. In some aspects, the threshold amount of time may correspond to a number of transmission cycles (e.g., one transmission cycle, two transmission cycles, three transmission cycles, and so on). Additionally, or alternatively, the activation condition may include determining that a link quality between the UE 120 and the base station 110 does not satisfy a threshold.

In some aspects, the UE 120 may determine that the activation condition is satisfied and may transmit, to the base station 110, a request to activate repetitions. The request may be transmitted in UCI, a MAC-CE, an RRC message, and/or the like. In this case, the base station 110 may determine that the activation condition is satisfied based at least in part on receiving the request.

In some aspects, the base station 110 may determine that the activation condition is satisfied and may transmit, to the UE 120, an instruction to activate (e.g., to monitoring for) the repetitions. The instruction may be transmitted in DCI, a MAC-CE, an RRC message, and/or the like. In this case, the UE 120 may determine that the activation condition is satisfied based at least in part on receiving the instruction.

Thus, in some aspects, the base station 110 and the UE 120 may independently determine that the activation condition is satisfied, without requiring signaling to indicate the activation, thereby reducing signaling overhead. In some aspects, only the base station 110 may independently determine that the activation condition is satisfied, and may signal the UE 120 to activate repetitions, thereby conserving resources of the UE 120 that would otherwise be used for an independent determination. In some aspects, only the UE 120 may independently determine that the activation condition is satisfied, and may signal the base station 110 to activate repetitions, thereby conserving resources of the base station 110 that would otherwise be used for an independent determination.

Although FIG. 6 shows operations associated with SPS, similar operations may occur in CG. For example, the UE 120 may transmit an initial PUSCH communication to the base station 110 within the initial transmission window of the Cycle X+2 (e.g., on a first beam). The base station 110 may fail to receive or decode the initial PUSCH communication, and may determine that an activation condition is satisfied. For example, the base station 110 may determine that the activation condition is satisfied by determining that the base station 110 has not successfully received the initial PUSCH communication. Based at least in part on determining that the activation condition is satisfied, the base station 110 may activate (e.g., monitor for) repetitions. The base station 110 may indicate that the initial PUSCH communication has failed by transmitting a NACK corresponding to the initial PUSCH communication or by refraining from transmitting ACK/NACK feedback corresponding to the initial PUSCH communication. The UE 120 may determine that the activation condition is satisfied, such as by determining that the UE 120 has received a NACK of the initial PUSCH transmission, in a similar manner as described above. Based at least in part on determining that the activation condition is satisfied, the UE 120 may activate (e.g., transmit) repetitions. By activating repetitions, the UE 120 and/or the base station 110 may improve reliability when an initial transmission fails.

As indicated above, FIG. 6 is provided as an example. Other examples may differ from what is described with regard to FIG. 6.

Figure 7:
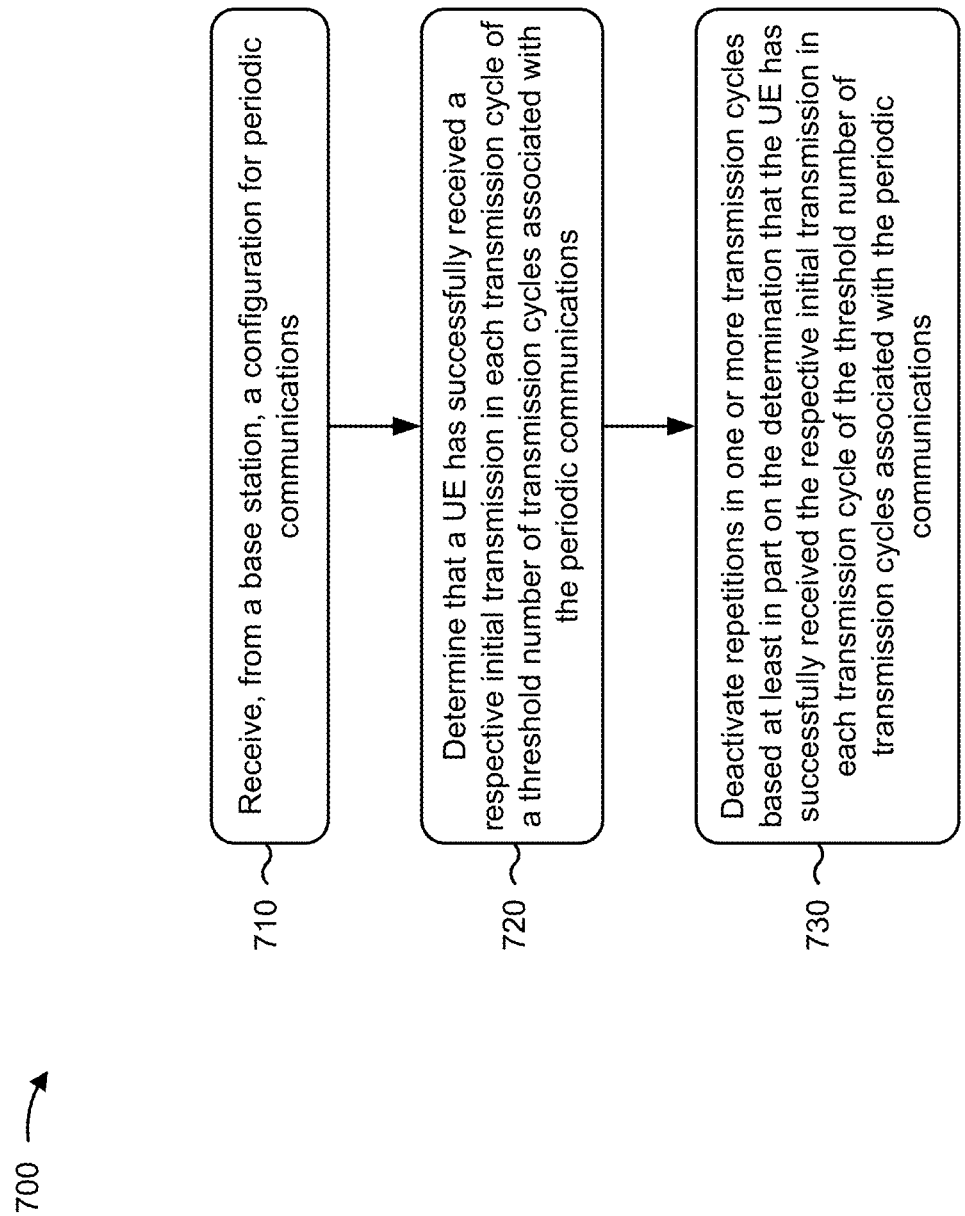
FIGS. 7-10 are diagrams illustrating example processes relating to deactivating resources for repetition of periodic communications, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120 and/or the like) performs operations associated with deactivating resources for repetition of periodic communications.

As shown in FIG. 7, in some aspects, process 700 may include receiving, from a base station, a configuration for periodic communications (block 710). For example, the UE (e.g., using receive processor 258, controller/processor 280, memory 282, and/or the like) may receive, from a base station, a configuration for periodic communications, as described above in connection with FIG. 5 and/or FIG. 6.

As further shown in FIG. 7, in some aspects, process 700 may include determining that the UE has successfully received a respective initial transmission in each transmission cycle of a threshold number of transmission cycles associated with the periodic communications (block 720). For example, the UE (e.g., using controller/processor 280, memory 282, and/or the like) may determine that the UE has successfully received a respective initial transmission in each transmission cycle of a threshold number of transmission cycles associated with the periodic communications, as described above in connection with FIG. 5 and/or FIG. 6.

As further shown in FIG. 7, in some aspects, process 700 may include deactivating repetitions in one or more transmission cycles based at least in part on the determination (block 730). For example, the UE (e.g., using receive processor 258, transmit processor 264, controller/processor 280, memory 282, and/or the like) may deactivate repetitions in one or more transmission cycles based at least in part on the determination, as described above in connection with FIG. 5 and/or FIG. 6.

Process 700 may include additional aspects, such as any single aspect or any combination of aspects described below and/or in connection with one or more other processes described elsewhere herein.

In a first aspect, each transmission cycle includes a first time period for an initial transmission and a second time period for a set of repetitions that are transmitted using a corresponding set of beams.

In a second aspect, alone or in combination with the first aspect, the threshold number is greater than one.

In a third aspect, alone or in combination with one or more of the first and second aspects, the threshold number of transmission cycles includes multiple consecutive transmission cycles.

In a fourth aspect, alone or in combination with one or more of the first through third aspects, determining that the UE has successfully received the respective initial transmission in each transmission cycle of the threshold number of transmission cycles comprises determining that the UE has transmitted a threshold number of acknowledgements for the respective initial transmissions.

In a fifth aspect, alone or in combination with one or more of the first through fourth aspects, deactivating the repetitions comprises refraining from monitoring for the repetitions in the one or more transmission cycles.

In a sixth aspect, alone or in combination with one or more of the first through fifth aspects, process 700 includes transmitting, to the base station, a request to deactivate the repetitions.

In a seventh aspect, alone or in combination with one or more of the first through sixth aspects, the request is transmitted in uplink control information, a media access control (MAC) control element (CE), a radio resource control (RRC) message, or a combination thereof.

In an eighth aspect, alone or in combination with one or more of the first through seventh aspects, each respective initial transmission is a respective physical downlink shared channel (PDSCH) communication, and the repetitions include one or more PDSCH communications and one or more physical downlink control channel (PDCCH) communications.

In a ninth aspect, alone or in combination with one or more of the first through eighth aspects, process 700 includes determining that a link quality of a link between the UE and the base station satisfies a threshold; and deactivating the repetitions based at least in part on determining that the link quality satisfies the threshold.

In a tenth aspect, alone or in combination with one or more of the first through ninth aspects, the configuration indicates the threshold number.

In an eleventh aspect, alone or in combination with one or more of the first through tenth aspects, the threshold number is based at least in part on mobility associated with the UE, a coherence time of a channel used for communication between the UE and the base station, or a combination thereof.

In a twelfth aspect, alone or in combination with one or more of the first through eleventh aspects, process 700 includes determining that a threshold amount of time has elapsed after deactivating the repetitions; and activating repetitions in a transmission cycle, subsequent to the one or more transmission cycles, based at least in part on determining that the threshold amount of time has elapsed.

In a thirteenth aspect, alone or in combination with one or more of the first through twelfth aspects, process 700 includes determining that an initial transmission from the base station has not been successfully received; and activating repetitions in a transmission cycle, subsequent to the one or more transmission cycles, based at least in part on determining that the initial transmission from the base station has not been successfully received.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
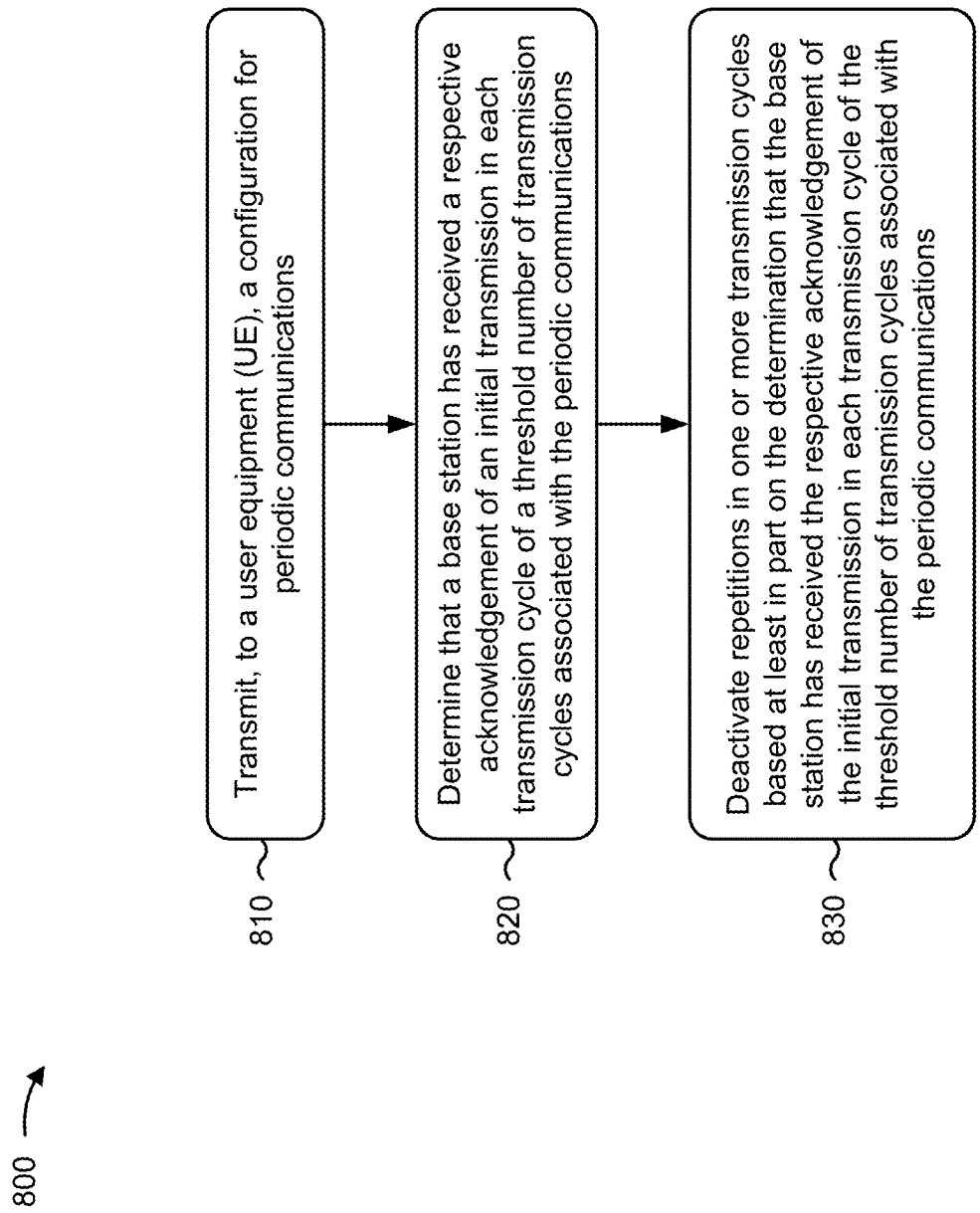

FIG. 8 is a diagram illustrating an example process 800 performed, for example, by a base station, in accordance with various aspects of the present disclosure. Example process 800 is an example where a base station (e.g., base station 110 and/or the like) performs operations associated with deactivating resources for repetition of periodic communications.

As shown in FIG. 8, in some aspects, process 800 may include transmitting, to a user equipment (UE), a configuration for periodic communications (block 810). For example, the base station (e.g., using transmit processor 220, controller/processor 240, memory 242, and/or the like) may transmit, to a UE, a configuration for periodic communications, as described above in connection with FIG. 5 and/or FIG. 6.

As further shown in FIG. 8, in some aspects, process 800 may include determining that the base station has received a respective acknowledgement of an initial transmission in each transmission cycle of a threshold number of transmission cycles associated with the periodic communications (block 820). For example, the base station (e.g., using controller/processor 240, memory 242, and/or the like) may determine that the base station has received a respective acknowledgement of an initial transmission in each transmission cycle of a threshold number of transmission cycles associated with the periodic communications, as described above in connection with FIG. 5 and/or FIG. 6.

As further shown in FIG. 8, in some aspects, process 800 may include deactivating repetitions in one or more transmission cycles based at least in part on the determination (block 830). For example, the base station (e.g., using transmit processor 220, receive processor 238, controller/processor 240, memory 242, and/or the like) may deactivate repetitions in one or more transmission cycles based at least in part on the determination, as described above in connection with FIG. 5 and/or FIG. 6.

Process 800 may include additional aspects, such as any single aspect or any combination of aspects described below and/or in connection with one or more other processes described elsewhere herein.

In a first aspect, each transmission cycle includes a first time period for an initial transmission and a second time period for a set of repetitions that are transmitted using a corresponding set of beams.

In a second aspect, alone or in combination with the first aspect, the threshold number is greater than one.

In a third aspect, alone or in combination with one or more of the first and second aspects, the threshold number of transmission cycles includes multiple consecutive transmission cycles.

In a fourth aspect, alone or in combination with one or more of the first through third aspects, deactivating the repetitions comprises refraining from transmitting the repetitions in the one or more transmission cycles.

In a fifth aspect, alone or in combination with one or more of the first through fourth aspects, process 800 includes transmitting, to the UE, an instruction to refrain from monitoring for the repetitions.

In a sixth aspect, alone or in combination with one or more of the first through fifth aspects, the instruction is transmitted in downlink control information, a MAC-CE, an RRC message, or a combination thereof.

In a seventh aspect, alone or in combination with one or more of the first through sixth aspects, each respective acknowledgement is for a PDSCH communication, and the repetitions include one or more PDSCH communications and one or more PDCCH communications.

In an eighth aspect, alone or in combination with one or more of the first through seventh aspects, process 800 includes determining that a link quality of a link between the UE and the base station satisfies a threshold; and deactivating the repetitions based at least in part on determining that the link quality satisfies the threshold.

In a ninth aspect, alone or in combination with one or more of the first through eighth aspects, the configuration indicates the threshold number.

In a tenth aspect, alone or in combination with one or more of the first through ninth aspects, the threshold number is based at least in part on mobility associated with the UE, a coherence time of a channel used for communication between the UE and the base station, or a combination thereof.

In an eleventh aspect, alone or in combination with one or more of the first through tenth aspects, process 800 includes determining that a threshold amount of time has elapsed after deactivating the repetitions; and activating repetitions in a transmission cycle, subsequent to the one or more transmission cycles, based at least in part on determining that the threshold amount of time has elapsed.

In a twelfth aspect, alone or in combination with one or more of the first through eleventh aspects, process 800 includes determining that an initial transmission from the base station has not been successfully received by the UE; and activating repetitions in a transmission cycle, subsequent to the one or more transmission cycles, based at least in part on determining that the initial transmission from the base station has not been successfully received by the UE.

In a thirteenth aspect, alone or in combination with one or more of the first through twelfth aspects, process 800 includes instructing another base station or transmit receive point to refrain from transmitting at least one of initial transmissions or repetitions to the UE in the one or more transmission cycles.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
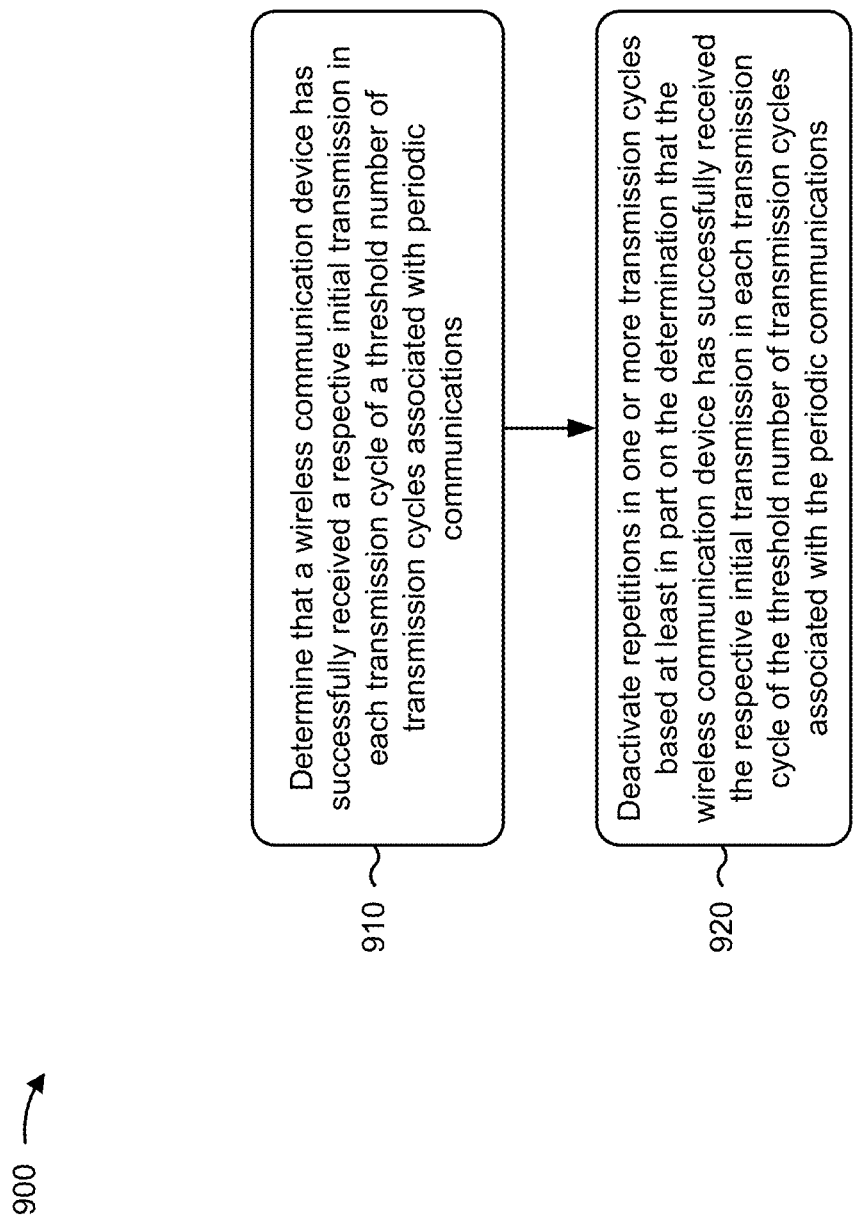

FIG. 9 is a diagram illustrating an example process 900 performed, for example, by a wireless communication device, in accordance with various aspects of the present disclosure. Example process 900 is an example where a wireless communication device (e.g., UE 120, base station 110, and/or the like) performs operations associated with deactivating resources for repetition of periodic communications.

As shown in FIG. 9, in some aspects, process 900 may include determining that the wireless communication device has successfully received a respective initial transmission in each transmission cycle of a threshold number of transmission cycles associated with periodic communications (block 910). For example, the wireless communication device (e.g., using controller/processor 240, memory 242, controller/processor 280, memory 282, and/or the like) may determine that the wireless communication device has successfully received a respective initial transmission in each transmission cycle of a threshold number of transmission cycles associated with periodic communications, as described above in connection with FIG. 5 and/or FIG. 6.

As further shown in FIG. 9, in some aspects, process 900 may include deactivating repetitions in one or more transmission cycles based at least in part on the determination (block 920). For example, the wireless communication device (e.g., using transmit processor 220, receive processor 238, controller/processor 240, memory 242, receive processor 258, transmit processor 264, controller/processor 280, memory 282, and/or the like) may deactivate repetitions in one or more transmission cycles based at least in part on the determination, as described above in connection with FIG. 5 and/or FIG. 6.

Process 900 may include additional aspects, such as any single aspect or any combination of aspects described below and/or in connection with one or more other processes described elsewhere herein.

In some aspects, deactivating the repetitions comprises refraining from monitoring for the repetitions in the one or more transmission cycles.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
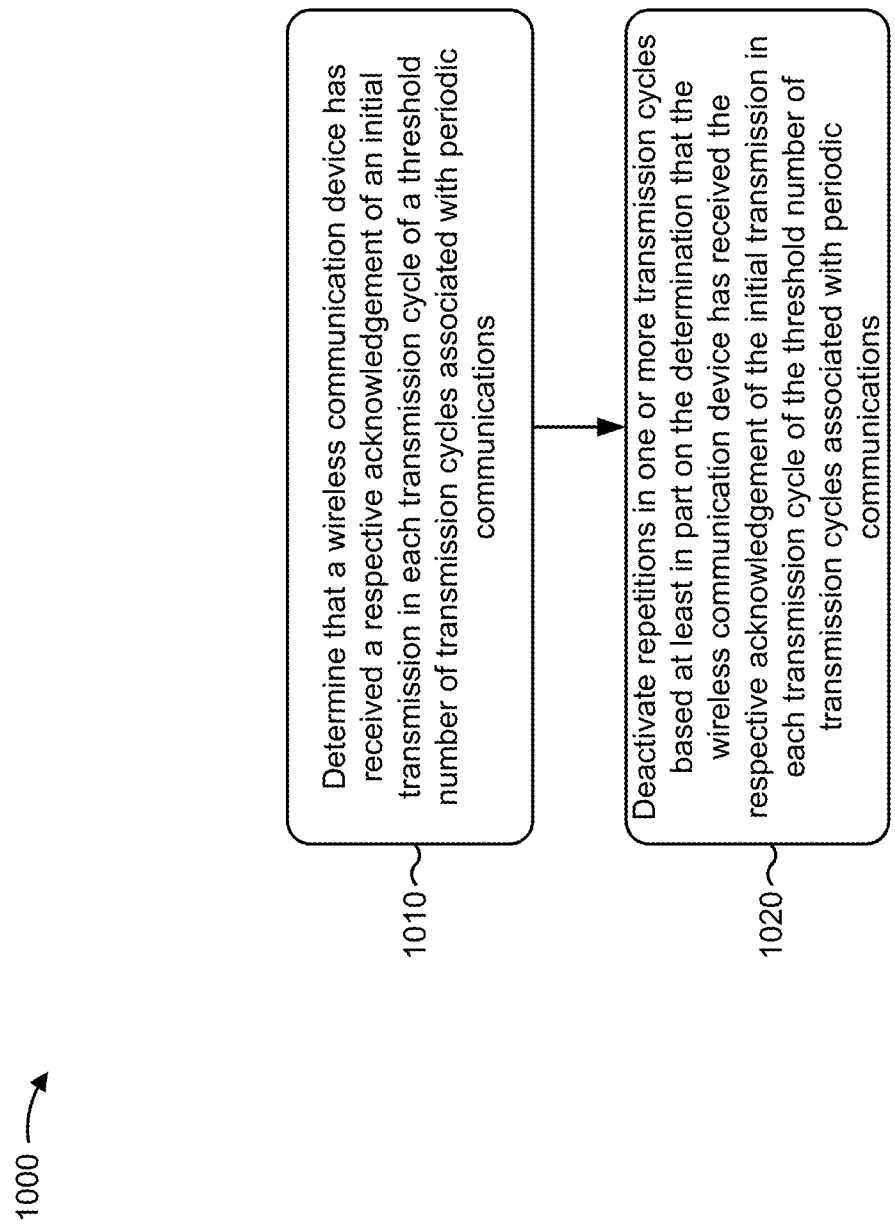

FIG. 10 is a diagram illustrating an example process 1000 performed, for example, by a wireless communication device, in accordance with various aspects of the present disclosure. Example process 1000 is an example where a wireless communication device (e.g., UE 120, base station 110, and/or the like) performs operations associated with deactivating resources for repetition of periodic communications.

As shown in FIG. 10, in some aspects, process 1000 may include determining that the wireless communication device has received a respective acknowledgement of an initial transmission in each transmission cycle of a threshold number of transmission cycles associated with periodic communications (block 1010). For example, the wireless communication device (e.g., using controller/processor 240, memory 242, controller/processor 280, memory 282, and/or the like) may determine that the wireless communication device has received a respective acknowledgement of an initial transmission in each transmission cycle of a threshold number of transmission cycles associated with periodic communications, as described above in connection with FIG. 5 and/or FIG. 6.

As further shown in FIG. 10, in some aspects, process 1000 may include deactivating repetitions in one or more transmission cycles based at least in part on the determination (block 1020). For example, the wireless communication device (e.g., using transmit processor 220, receive processor 238, controller/processor 240, memory 242, receive processor 258, transmit processor 264, controller/processor 280, memory 282, and/or the like) may deactivate repetitions in one or more transmission cycles based at least in part on the determination, as described above in connection with FIG. 5 and/or FIG. 6.

Process 1000 may include additional aspects, such as any single aspect or any combination of aspects described below and/or in connection with one or more other processes described elsewhere herein.

In some aspects, deactivating the repetitions comprises refraining from transmitting the repetitions in the one or more transmission cycles.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a base station, a configuration for periodic communications; and
   deactivating repetitions in one or more transmission cycles based at least in part on a determination that the UE has successfully received a respective initial transmission in each transmission cycle of a threshold number of transmission cycles associated with the periodic communications,
   wherein a number of the threshold number of transmission cycles is greater than one,
   wherein each transmission cycle, of the threshold number of transmission cycles, includes a first time period for the respective initial transmission and a second time period for a respective set of repetitions, and
   wherein the one or more transmission cycles are subsequent to the threshold number of transmission cycles.

2. The method of claim 1, wherein the respective set of repetitions are transmitted using a corresponding set of beams.

3. The method of claim 1, wherein the threshold number of transmission cycles includes multiple consecutive transmission cycles.

4. The method of claim 1, further comprising determining that the UE has successfully received the respective initial transmission in each transmission cycle of the threshold number of transmission cycles by determining that the UE has transmitted a threshold number of acknowledgements for the respective initial transmissions.

5. The method of claim 1, wherein deactivating the repetitions comprises refraining from monitoring for the repetitions in the one or more transmission cycles.

6. The method of claim 1, further comprising transmitting, to the base station, a request to deactivate the repetitions.

7. The method of claim 6, wherein the request is transmitted in uplink control information, a media access control (MAC) control element (CE), a radio resource control (RRC) message, or a combination thereof.

8. The method of claim 1, wherein each respective initial transmission is a respective physical downlink shared channel (PDSCH) communication, and wherein each respective set of repetitions includes one or more of one or more PDSCH communications or one or more physical downlink control channel (PDCCH) communications.

9. The method of claim 1, wherein the repetitions are deactivated further based at least in part on a determination that a link quality of a link between the UE and the base station satisfies a link quality threshold.

10. The method of claim 1, wherein the configuration indicates the number of the threshold number of transmission cycles.

11. The method of claim 1, wherein the number of the threshold number of transmission cycles is based at least in part on mobility associated with the UE, a coherence time of a channel used for communication between the UE and the base station, or a combination thereof.

12. The method of claim 1, further comprising activating repetitions in a transmission cycle, subsequent to the one or more transmission cycles, based at least in part on a subsequent determination that a threshold amount of time has elapsed after deactivating the repetitions or that a subsequent initial transmission from the base station has not been successfully received.

13. A method of wireless communication performed by a network node, comprising:
transmitting, to a user equipment (UE), a configuration for periodic communications; and
deactivating repetitions in one or more transmission cycles based at least in part on a determination that the network node has received a respective acknowledgement of an initial transmission in each transmission cycle of a threshold number of transmission cycles associated with the periodic communications,
wherein a number of the threshold number of transmission cycles is greater than one,
wherein each transmission cycle, of the threshold number of transmission cycles, includes a first time period for the respective initial transmission and a second time period for a respective set of repetitions, and
wherein the one or more transmission cycles are subsequent to the threshold number of transmission cycles.

14. The method of claim 13, wherein the respective set of repetitions are transmitted using a corresponding set of beams.

15. The method of claim 13, wherein deactivating the repetitions comprises refraining from transmitting the repetitions in the one or more transmission cycles.

16. The method of claim 13, further comprising transmitting, to the UE, an instruction to refrain from monitoring for the repetitions.

17. The method of claim 13, wherein each respective acknowledgement is for a physical downlink shared channel (PDSCH) communication, and wherein each respective set of repetitions includes one or more of one or more PDSCH communications or one or more physical downlink control channel (PDCCH) communications.

18. The method of claim 13, wherein the repetitions are deactivated further based at least in part on a determination that a link quality of a link between the UE and the network node satisfies a link quality threshold.

19. The method of claim 13, wherein the configuration indicates the number of the threshold number of transmission cycles.

20. The method of claim 13, wherein the number of the threshold number of transmission cycles is based at least in part on mobility associated with the UE, a coherence time of a channel used for communication between the UE and the network node, or a combination thereof.

21. The method of claim 13, further comprising activating repetitions in a transmission cycle, subsequent to the one or more transmission cycles, based at least in part on a subsequent determination that a threshold amount of time has elapsed after deactivating the repetitions or that a subsequent initial transmission from the network node has not been successfully received by the UE.

22. The method of claim 13, further comprising instructing another network node or transmit receive point to refrain from transmitting at least one of initial transmissions or repetitions to the UE in the one or more transmission cycles.

23. A method of wireless communication performed by a wireless communication device, comprising:
determining that the wireless communication device has successfully received a respective initial transmission or a respective acknowledgement of an initial transmission in each transmission cycle of a threshold number of transmission cycles associated with periodic communications; and
deactivating repetitions in one or more transmission cycles based at least in part on the determination,
wherein a number of the threshold number of transmission cycles is greater than one,
wherein each transmission cycle, of the threshold number of transmission cycles, includes a first time period for the respective initial transmission and a second time period for a respective set of repetitions, and
wherein the one or more transmission cycles are subsequent to the threshold number of transmission cycles.

24. The method of claim 23, wherein deactivating the repetitions comprises refraining from monitoring for the repetitions in the one or more transmission cycles based at least in part on determining that the wireless communication device has successfully received the respective initial transmission in each transmission cycle of the threshold number of transmission cycles associated with periodic communications.

25. The method of claim 23, wherein deactivating the repetitions comprises refraining from transmitting the repetitions in the one or more transmission cycles based at least in part on determining that the wireless communication device has successfully received the respective acknowledgement of the initial transmission in each transmission cycle of the threshold number of transmission cycles associated with periodic communications.

26. A wireless communication device, comprising:
a memory; and
one or more processors configured to:
  determine that the wireless communication device has successfully received a respective initial transmission or a respective acknowledgement of an initial transmission in each transmission cycle of a threshold number of transmission cycles associated with periodic communications; and
  deactivate repetitions in one or more transmission cycles based at least in part on the determination,
    wherein a number of the threshold number of transmission cycles is greater than one,
    wherein each transmission cycle, of the threshold number of transmission cycles, includes a first time period for the respective initial transmission and a second time period for a respective set of repetitions, and
    wherein the one or more transmission cycles are subsequent to the threshold number of transmission cycles.

27. The wireless communication device of claim 26, wherein the threshold number of transmission cycles includes multiple consecutive transmission cycles.

28. The wireless communication device of claim 26, wherein, when deactivating the repetitions, the one or more processors are configured to refrain from monitoring for the repetitions in the one or more transmission cycles.

29. The wireless communication device of claim 26, wherein, when deactivating the repetitions, the one or more processors are further configured to:
  transmit, to a base station, a request to deactivate the repetitions.

30. The wireless communication device of claim 26, wherein the repetitions are deactivated further based at least in part on a determination that a link quality of a link between the wireless communication device and a base station satisfies a link quality threshold.

* * * * *